Jan. 13, 1948.  A. C. RUGE  2,434,438
CONDITION RESPONSIVE CIRCUIT FOR ROTATABLE MEMBERS
Filed May 23, 1947  2 Sheets-Sheet 1

INVENTOR
Arthur C. Ruge
BY
ATTORNEY

Jan. 13, 1948.   A. C. RUGE   2,434,438
CONDITION RESPONSIVE CIRCUIT FOR ROTATABLE MEMBERS
Filed May 23, 1947   2 Sheets-Sheet 2
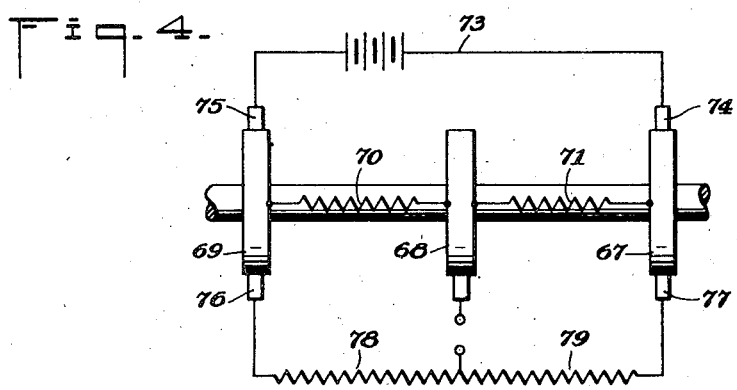
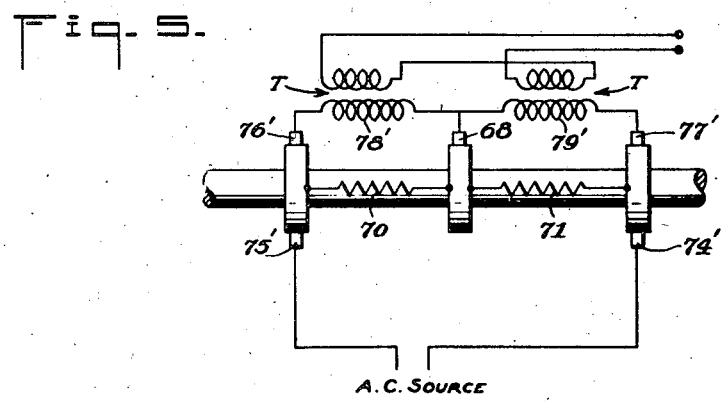
INVENTOR
Arthur C. Ruge
BY
ATTORNEY Patented Jan. 13, 1948

2,434,438

UNITED STATES PATENT OFFICE 2,434,438

CONDITION RESPONSIVE CIRCUIT FOR ROTATABLE MEMBERS

Arthur C. Ruge, Cambridge, Mass., assignor to The Baldwin Locomotive Works, a corporation of Pennsylvania Application May 23, 1947, Serial No. 750,080

4 Claims. (Cl. 177—351)

This invention relates generally to apparatus for measuring certain conditions of rotatable members which may be shafts, airplane propellers or other revolving elements, and more particularly for measuring conditions such, for example, as torque, temperature, pressure, speed, acceleration or strains arising from various causes, where the condition to be measured produces a change in the electrical impedance of a responsive element attached to and rotating with the member. This application is a continuation in part of my co-pending application, Serial No. 508.216. filed October 29, 1943, and which has become Patent 2,423,620, July 8, 1947.

One object of my invention is to provide an improved circuit in which any or all arms of a bridge may be brought out through slip rings without requiring any high resistance elements in the bridge to minimize brush contact resistance errors.

A further object is to provide an improved bridge circuit in which two arms thereof may be differentially variable and yet compensate each other to a high degree for temperature effects.

Other objects and advantages will be more apparent to those skilled in the art from the following description of the accompanying drawings in which:

Fig. 1 diagrammatically illustrates one form of my improved circuit for allowing any or all arms of the bridge to be brought out through slip rings without requiring high resistance elements in the bridge;

Fig. 4 is a further modification in which two arms of the bridge circuit may be differentially variable together with temperature compensation; and Fig. 5 is a modification of Fig. 4.

Figure 1:
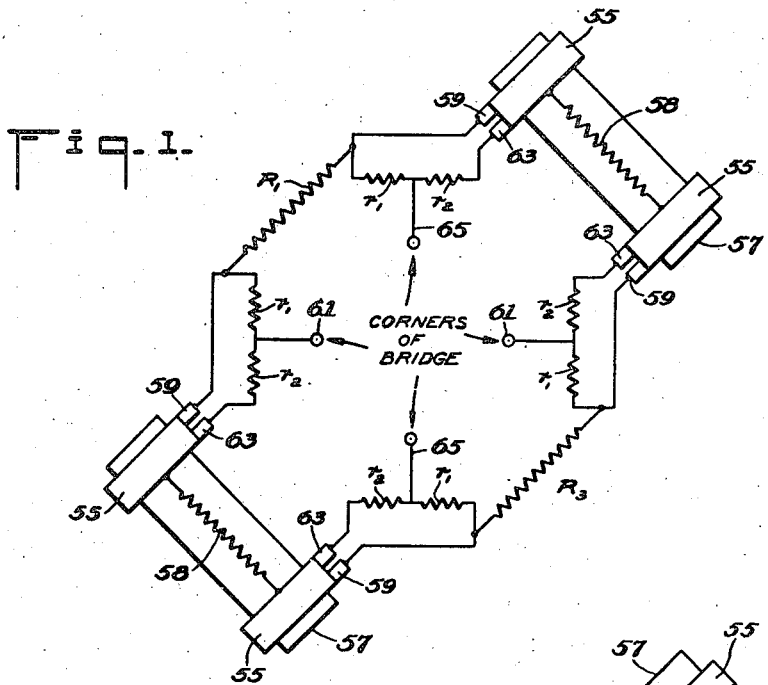
Figure 2:
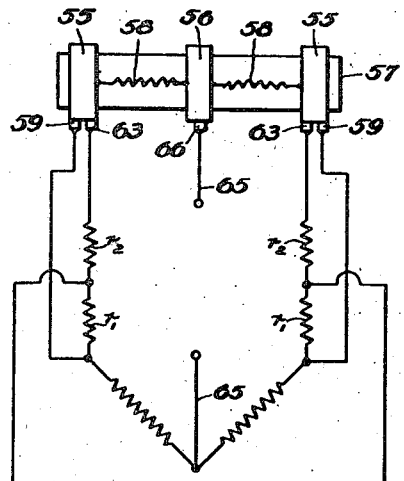
Figs. 2 and 3 are modified circuit diagrams of Fig. 1.

The circuits disclosed in Figs. 1, 2. and 3 are improvements over the disclosure contained in my copending application, Serial No. 508.216. Fig. 5, in that they show how any or all arms of the bridge may be brought out through slip rings and in that none of the bridge arms is limited to being of high impedance or resistance as was the case there. These advantages I obtain in the circuits of Figs. 1, 2, and 3 without any loss in sensitivity or accuracy and I therefore have broadened the scope and usefulness of the earlier disclosure to an important extent. To facilitate the description, corresponding parts of the three figures are given the same reference number.

In Fig. 1 I show how one or more arms of the bridge can be brought out through slip rings. To accomplish this I employ a pair of slip rings 55 mounted on a rotatable shaft or other member 57 which also carries a suitable condition-responsive impedance element 58, the two ends of 58 being connected to rings 55. For purposes of explanation, element 58 may be considered to be a bonded wire strain gage or a temperature-responsive resistance element, although any kind of condition-responsive impedance element can be used equally well by obvious and suitable choice of circuit elements in the other parts of the circuit. Against each slip ring there bears what I call a "main" brush 59 whose principal function is to provide direct connection from element 58 to the adjacent bridge arm, and an "auxiliary" brush 63 which serves primarily to establish a potential point at the nearest "bridge corner" substantially independent of contact resistance of brushes 59 and 63.

In Fig. 1 for purposes of illustration I have shown two arms 58 brought out through slip rings and two non-rotating arms $R_1$ and $R_3$ to complete the bridge. It will be seen that any or all arms could be brought out through slip rings in accordance with my present invention. At each corner where a slip ring connection exists I connect the main brush 59 directly to the adjacent bridge arm. In parallel with this I connect auxiliary brush 63 to the same adjacent bridge arm by means of a voltage divider $r_1$, $r_2$. The junctions of $r_1$ and $r_2$ are labelled "corners of bridge." Any desired two opposite corners such as 61 may be used as terminals to supply power to the bridge, the remaining two corners 65 serving as the bridge output terminals. The "adjacent bridge arm" just referred to may be a non-rotating arm such as $R_1$ or $R_3$ or it may be another rotating arm, in which case connections would be made through main and auxiliary brushes as already shown in the figure for two rotatable arms of the bridge. The bridge may be balanced by varying any or all of the arms in any convenient manner.

The essential feature of Figs. 1 and 2 is the use of the voltage divider and auxiliary brush circuit at each corner having a slip ring. This permits the use of low impedance or resistance bridge arms throughout if desired, while making the effects of brush contact resistance negligibly small. It also makes it practical to use low-resistance galvanometers or other devices as bridge unbalance indicators. In practice, $r_1$ and $r_2$ are made large relative to the expected variations in brush resistance so that the potential at their junction point is substantially unaffected even though considerable resistance variations take place at brush contacts 59 and 63. The proper choice of resistances or impedances $r_1$ and $r_2$ can be made either by experiment or by calculation in accordance with conventional circuit theory; in any case, the final choice will of course depend upon the accuracy desired as well as upon the magnitudes of the several elements of the circuit and their expected variations.

In Fig. 2 I show how the circuit of Fig. 1 may be simplified when it is permissible to use three slip rings where two adjacent arms 58 rotate with the same member 57. Here, the connections are brought out from two rings 55 exactly as shown in Fig. 1, while the connection from ring 56 (which is common to the two arms 58) is brought out by means of a simple brush 66. This circuit has the advantage of eliminating one voltage divider corner while still serving to reduce the effects of brush contact resistance to negligible proportions. It may be seen that the two arms 58 may be differentially variable, as to strain response for example, and yet compensate each other perfectly for temperature effects. If strain-sensitive gages are used for arms 58 the circuit can by proper arrangement of the gages be made responsive only to bending or only to torsion or only to thrust, as desired. Or, arms 58 may be devices differentially responsive to temperature or other functions, or they may, for example, be the two arms of a conventional two-arm electromagnetic strain gage, etc., without affecting the scope of my invention. As with any Wheatstone bridge, the power may be impressed across any two opposite corners such as 61 while the remaining corners 65 serve as output terminals.

Figure 3:
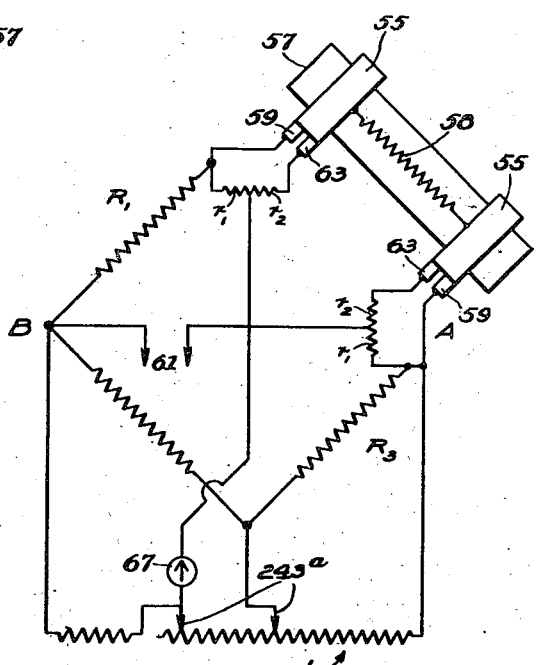

Fig. 3 shows a bridge balancing and measuring circuit which is a further improvement over that shown in my copending application, Serial No. 508,216, Fig. 6, in that I here show how one or more arms of the bridge may be brought out through slip rings in accordance with my present invention without introducing appreciable errors, even though relatively large brush contact resistance variations may exist during the course of measurement. For purposes of illustration I have shown only one arm 58 brought out through slip rings 55 mounted on rotatable member 57, but it is easily seen that any or all arms may be similarly brought out by following the teachings of Figs. 1 and 2.

The operation of the Fig. 3 circuit is as follows: A source of D. C. or A. C. voltage is applied at "bridge corners" 61. The voltage for the bridge balancing circuit 243' is obtained through a main brush 59 if a slip ring connection occurs at a power corner of the bridge, as at "A" in Fig. 3, and through a direct connection to the power source if no slip ring connection occurs at a power corner of the bridge, as at "B" in Fig. 3. By adjusting the contacts 243a, the bridge unbalance may be determined by means of any convenient unbalance indicator 67. It is to be noted that in this arrangement the bridge balancing method, while utilizing only a single power source, does not depend upon the power source holding its voltage constant for obtaining fully precise measurements.

Incidentally, instead of connecting 243a to brush 59 as shown at "A" in Fig. 3, I can just as well connect it directly to the power source where it comes into the junction of $r_1$ and $r_2$ and in some cases this may be preferable. It is inherent in my circuit that it makes little difference which point of connection is chosen for the balancing circuit.

It is to be understood throughout the above disclosure that, while I have referred to certain brushes as "main" brushes and to others as "auxiliary" brushes, the terms are used merely for purposes of identification. Their functions in my present invention are so interdependent that, strictly speaking, it is not possible to identify one kind as "main" and the other as "auxiliary."

In Fig. 4 when it is permissible to use three slip rings 67, 68 and 69 the circuit of Fig. 5 may be simplified into that shown in Fig. 4. In this arrangement two arms 70 and 71 of the bridge rotate with a shaft or other rotating member, and the power circuit 73 with its main brushes 74 and 75 is independent of the Wheatstone bridge circuit which includes auxiliary brushes 76 and 77 and high resistances 78 and 79. The two external arms 78 and 79 are made large relative to the resistance at the auxiliary brushes and hence are negligibly affected by variations in the brush resistance. Suitable instrumentation is connected across brush 68 and a point between resistances 78 and 79. As with any Wheatstone bridge, the battery and galvanometer may be interchanged if desired without impairing the functioning of the device.

This circuit has the advantage that the gage arms 70 and 71 may be differentially variable and yet compensate each other perfectly for temperature effects. As disclosed in my copending application Serial No. 430,921, now Patent No. 2,392,293, January 1, 1946, covering Torque measuring apparatus, if strain sensitive gages are used for the gage arms 70 and 71 the circuit may by proper arrangement of the gages be made responsive only to bending or only to torsion or only to thrust, as desired. Arms 70 and 71 may also be devices differentially responsive to temperature or other functions, or they may for example be the two arms of a conventional two-arm electro-magnetic strain gage, etc., without affecting the scope of my invention.

By way of further illustrating the broad usefulness of the circuit shown in Fig. 4, I have shown in Fig. 5 a variation in which the two external bridge arms 78' and 79' are primary windings of transformers T, T, the secondaries of which are connected in opposition so as to provide means for detecting the bridge unbalance. Either A. C. or D. C. current may be fed into the power or main brushes 74' and 75', depending upon the nature of the measuring, detecting, or controlling problem. Since the secondaries of the transformers can be made to draw a negligible current (as compared with the current flowing through the main brushes), it will be seen that the auxiliary brushes 68', 76' and 77' will not adversely affect the accuracy of the device.

From the disclosure herein it is seen that I have provided a relatively simple, but highly effective, bridge circuit that minimizes brush contact resistance errors as well as allowing two arms of a bridge to be differentially variable, together with a high order of temperature compensation.

It will of course be understood that various changes in details of construction and arrangement of parts may be made by those skilled in the art without departing from the spirit of the invention as set forth in the appended claims.

I claim:

1. Apparatus responsive to a change of condition comprising, in combination, a rotating member, a Wheatstone bridge having two arms constituting electrical impedance means mounted on said member for rotation therewith and at least one of said arms being adapted to undergo a change in impedance in response to a change of said condition, three slip rings also mounted on said member for rotation therewith, a power circuit having main brushes engaging two of said rings for supplying current to said arms on the rotating member, auxiliary brushes engaging said two rings which are engaged by said main brushes, a third brush engaging said third slip ring, and the two arms on the rotating member and the remainder of the Wheatstone bridge being connected together in a circuit through said two auxiliary brushes, whereby unbalance of said bridge is transmitted through one of said circuits, said third slip ring and its brush.

2. Apparatus responsive to a change of condition comprising, in combination, a rotatable member, a bridge circuit, at least one arm of which is comprised of electrical impedance means mounted on said rotatable member for rotation therewith and adapted to undergo a change of impedance in response to a change of condition, a pair of slip rings mounted on said rotatable member and connected to said impedance means, main and auxiliary brushes engaging each of said slip rings, a voltage divider connected to one of said main brushes and to one adjacent bridge arm and being also connected to said adjacent bridge arm through one of said auxiliary brushes, the other of said slip rings being connected in the same manner to the other adjacent bridge arm, the dividing point of the voltage dividers being corners of the bridge, and means responsive to the unbalance of said bridge.

3. Apparatus responsive to a change of condition comprising, in combination, a rotatable member, a bridge circuit having two arms constituting electrical impedance means mounted on said member for rotation therewith and at least one of said arms being adapted to undergo a change in impedance in response to a change of said condition, three slip rings also mounted on said member for rotation therewith, one slip ring being common to said two arms and having a brush engaging same to form one corner of the bridge, main and auxiliary brushes engaging both of the other of said slip rings, one of said slip rings being connected through a main brush and a voltage divider to one adjacent bridge arm external to said rotatable member and being also connected to said adjacent bridge arm through an auxiliary brush, the other of said slip rings being connected in the same manner to the other adjacent arm, external to said rotatable member, the dividing point of the voltage dividers being corners of the bridge, and means responsive to the unbalance of said bridge.

4. The combination set forth in claim 2 further characterized in that a second circuit adjustably affects the balance of the bridge and is responsive to unbalance of the bridge, said second circuit involving both the main and auxiliary brushes in such a way as to substantially eliminate errors due to erratic resistances at the slip rings as well as errors due to varying or fluctuating power supply voltages.

ARTHUR C. RUGE.